(12) United States Patent
Piekniewski

(10) Patent No.: US 9,111,215 B2
(45) Date of Patent: Aug. 18, 2015

(54) CONDITIONAL PLASTICITY SPIKING NEURON NETWORK APPARATUS AND METHODS

(75) Inventor: Filip Piekniewski, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 360 days.

(21) Appl. No.: 13/541,531

(22) Filed: Jul. 3, 2012

(65) Prior Publication Data

US 2014/0012788 A1    Jan. 9, 2014

(51) Int. Cl.
*G06N 3/02*    (2006.01)
*G06N 3/04*    (2006.01)

(52) U.S. Cl.
CPC . *G06N 3/02* (2013.01); *G06N 3/049* (2013.01)

(58) Field of Classification Search
None
See application file for complete search history.

(56) References Cited

U.S. PATENT DOCUMENTS

| | | | |
|---|---|---|---|
| 5,138,447 A | 8/1992 | Shen et al. | |
| 5,272,535 A | 12/1993 | Elabd | |
| 5,355,435 A | 10/1994 | Deyong et al. | |
| 5,638,359 A | 6/1997 | Peltola et al. | |
| 6,418,424 B1 | 7/2002 | Hoffberg et al. | |
| 6,458,157 B1 | 10/2002 | Suaning | |
| 6,545,705 B1 | 4/2003 | Sigel et al. | |
| 6,546,291 B2 | 4/2003 | Merfeld et al. | |
| 6,625,317 B1 | 9/2003 | Gaffin et al. | |
| 7,580,907 B1 | 8/2009 | Rhodes | |
| 7,653,255 B2 | 1/2010 | Rastogi | |
| 7,737,933 B2 | 6/2010 | Yamano et al. | |
| 8,000,967 B2 | 8/2011 | Taleb | |
| 8,416,847 B2 | 4/2013 | Roman | |
| 2002/0038294 A1 | 3/2002 | Matsugu | |
| 2003/0216919 A1 | 11/2003 | Roushar | |
| 2004/0193670 A1 | 9/2004 | Langan et al. | |
| 2005/0036649 A1 | 2/2005 | Yokono et al. | |
| 2005/0283450 A1 | 12/2005 | Matsugu | |
| 2006/0161218 A1 | 7/2006 | Danilov | |
| 2007/0022068 A1 | 1/2007 | Linsker | |
| 2007/0208678 A1 | 9/2007 | Matsugu | |
| 2009/0287624 A1 | 11/2009 | Rouat et al. | |

(Continued)

FOREIGN PATENT DOCUMENTS

JP    4087423    3/1992

OTHER PUBLICATIONS

Knoblauch, et al., Memory Capacities for Synaptic and Structural Plasticity, Neural Computation, 2009, pp. 1-45.*

(Continued)

*Primary Examiner* — Wilbert L Starks
(74) *Attorney, Agent, or Firm* — Gazdzinski & Associates, PC

(57) ABSTRACT

Apparatus and methods for conditional plasticity in a neural network. In one approach, conditional plasticity mechanism is configured to select alternate plasticity rules when performing connection updates. The selection mechanism is adapted based on a comparison of actual connection efficiency and target efficiency. For instance, when actual efficiency is below the target value, the STDP rule may be modulated to increase long term potentiation. Similarly, when actual efficiency is above the target value, the STDP rule may be modulated to increase long term connection depression. The conditional plasticity mechanism dynamically adjusts connection efficacy, and prevents uncontrolled increase of connection weights, thereby improving network operation when processing information of a varying nature.

30 Claims, 11 Drawing Sheets

(56) References Cited

U.S. PATENT DOCUMENTS

| | | |
|---|---|---|
| 2010/0086171 A1 | 4/2010 | Lapstun |
| 2010/0166320 A1 | 7/2010 | Paquier |
| 2010/0235310 A1 | 9/2010 | Gage et al. |
| 2010/0299296 A1 | 11/2010 | Modha et al. |
| 2011/0137843 A1 | 6/2011 | Poon et al. |
| 2012/0084240 A1 | 4/2012 | Esser et al. |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0325766 A1 | 12/2013 | Petre et al. |
| 2013/0325777 A1 | 12/2013 | Petre et al. |
| 2014/0012788 A1 | 1/2014 | Piekniewski |
| 2014/0016858 A1 | 1/2014 | Richert |
| 2014/0064609 A1 | 3/2014 | Petre et al. |
| 2014/0122397 A1 | 5/2014 | Richert |
| 2014/0122398 A1 | 5/2014 | Richert |
| 2014/0122399 A1 | 5/2014 | Szatmary et al. |
| 2014/0156574 A1 | 6/2014 | Piekniewski et al. |

OTHER PUBLICATIONS

Sánchez, Efficient Simulation Scheme for Spiking Neural Networks, Doctoral Thesis, Università di Granada, Mar. 28, 2008, pp. 1-104.*

Berkes and Wiskott. Slow feature analysis yields a rich repertoire of complex cell properties. *Journal of Vision* (2005) vol. 5 (6).

Field, G.; Chichilnisky, E. Information Processing in the Primate Retina: Circuitry and Coding. *Annual Review of Neuroscience*, 2007, 30(1), 1-30.

Fiete, et al. Spike-Time-Dependent Plasticity and Heterosynaptic Competition Organize Networks to Produce Long Scale-Free Sequences of Neural Activity. *Neuron 65*, Feb. 25, 2010, pp. 563-576.

Földiák, P. Learning invariance from transformation sequences. *Neural Computation*, 1991, 3(2), 194-200.

Gerstner et al. (1996) A neuronal learning rule for sub-millisecond temporal coding. *Nature* vol. 383 (6595) pp. 76-78.

Hopfield JJ (1995) Pattern recognition computation using action potential timing for stimulus representation. *Nature* 376: 33-36.

Izhikevich E. M. and Hoppensteadt F.C. (2009) Polychronous Wavefront Computations. *International Journal of Bifurcation and Chaos*, 19:1733-1739.

Izhikevich E.M. (2004) Which Model to Use for Cortical Spiking Neurons? *IEEE Transactions on Neural Networks*, 15:1063-1070.

Izhikevich E.M. (2006) Polychronization: Computation With Spikes. *Neural Computation*, 18:245-282.

Izhikevich, E.M. (2007) Dynamical Systems in Neuroscience: The Geometry of Excitability and Bursting, *The MIT Press*, 2007.

Janowitz, M.K.; Van Rossum, M.C.W. Excitability changes that complement Hebbian learning. *Network, Computation in Neural Systems*, 2006, 17 (1), 31-41.

Khotanzad, Alireza, Classification of invariant image representations using a neural network, IEEF. Transactions on Acoustics, Speech, and Signal Processing vol. 38 No. Jun. 6, 1990 pp. 1028-1038.

Knoblauch, et al. Memory Capacities for Synaptic and Structural Plasticity, *Neural Computation* 2009, pp. 1-45.

Masquelier and Thorpe. Learning to recognize objects using waves of spikes and Spike Timing-Dependent Plasticity. *Neural Networks* (IJCNN), *The 2010 International Joint Conference on DOI*—10.1109/IJCNN.2010.5596934 (2010) pp. 1-8.

Meister, M. Multineuronal codes in retinal signaling. *Proceedings of the National Academy of sciences*. 1996, 93, 609-614.

Meister, M.; Berry, M.J. The neural code of the retina, *Neuron*. 1999, 22, 435-450.

Oster M., Lichtsteiner P., Delbruck T, Liu S. A Spike-Based Saccadic Recognition System. *ISCAS 2007. IEEE International Symposium on Circuits and Systems*, 2009, pp. 3083-3086.

Rekeczky, et al., "Cellular Multiadaptive Analogic Architecture: A Computational Framework for UAV Applications." May 2004.

Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.

Sanchez, Efficient Simulation Scheme for Spiking Neural Networks, *Doctoral Thesis*, Universita di Granada Mar. 28, 2008, pp. 1-104.

Schemmel, J., et al. Implementing synaptic plasticity in a VLSI spiking neural network model, Proceedings of the 2006 International Joint Conference on Neural Networks, Jul. 2006 pp. 1-6.

Schnitzer, M.J.; Meister, M.; Multineuronal Firing Patterns in the Signal from Eye to Brain. *Neuron*, 2003, 37, 499-511.

Serrano-Gotarredona, et al, "On Real-Time: AER 2-D Convolutions Hardware for Neuromorphic Spike-based Cortical Processing", Jul. 2008.

Sjostrom J., W. Gerstner. Spike-Timing Dependent Plasticity. *Scholarpedia*, [Online], 2010, 5(2), 1362.

Szatmary B. and Izhikevich E. M. (2010) Spike-Timing Theory of Working Memory. *PLoS Computational Biology*, 6(8): e1000879.

Thomas S. and Riesenhuber, M, 2004, Realistic Modeling of Simple and Complex Cell Tuning in the HMAX Model, and Implications for Invariant Object Recognition in Cortex, *AI Memo* 2004-017 Jul. 2004.

Thorpe S.; Ultra-Rapid Scene Categorization with a Wave of Spikes. In H.H. Bulthoff et al. (eds.), *Biologically Motivated Computer Vision, Lecture Notes in Computer Science*, 2002, 2525, pp. 1-15, Springer-Verlag, Berlin.

Thorpe, S.J., Delorme, A. & VanRullen, R. (2001). Spike-based strategies for rapid processing. *Neural Networks* 14, pp. 715-725.

Thorpe, S.J., Guyonneau, R., Guilbaud, N., Allegraud, J-M. & VanRullen, R. (2004). SpikeNet: real-time visual processing with one spike per neuron. *Neurocomputing*, 58-60, pp. 857-864.

Tim Gollisch and Markus Meister (2008) Rapid Neural Coding in the Retina with Relative Spike Latencies. *Science* 319:1108-1111.

Van Rullen R.; Thorpe, S. Rate Coding versus temporal order coding: What the Retinal ganglion cells tell the visual cortex. *Neural computation*, 2001, 13, 1255-1283.

VanRullen, R. & Koch, C. (2003). Is perception discrete or continuous? *Trends in Cognitive Sciences* 7(5), pp. 207-213.

VanRullen, R., Guyonneau, R. & Thorpe, S.J. (2005). Spike times make sense. *Trends in Neurosciences* 28(1).

Wallis, G.; Rolls, E. T. A model of invariant object recognition in the visual system. *Progress in Neurobiology*. 1997, 51, 167-194.

Wiskott, L.; Sejnowski, T.J. Slow feature analysis: Unsupervised learning of invariances. *Neural Computation*, 2002, 14, (4), 715-770.

Zarandy, et al., "Bi-i: A Standalone Ultra High Speed Cellular Vision System", Jun. 2005.

* cited by examiner

CONDITIONAL PLASTICITY SPIKING NEURON NETWORK APPARATUS AND METHODS

CROSS-REFERENCE TO RELATED APPLICATIONS

This application is related to co-owned U.S. patent application Ser. No. 13/152,119, entitled "SENSORY INPUT PROCESSING APPARATUS AND METHODS", filed on Jun. 2, 2011, co-owned and co-pending U.S. patent application Ser. No. 13/465,924, entitled "SPIKING NEURAL NETWORK FEEDBACK APPARATUS AND METHODS", filed May 7, 2012, co-owned and co-pending U.S. patent application Ser. No. 13/465,903 entitled "SENSORY INPUT PROCESSING APPARATUS IN A SPIKING NEURAL NETWORK", filed May 7, 2012, a co-owned U.S. patent application Ser. No. 13/465,918, entitled "SPIKING NEURAL NETWORK OBJECT RECOGNITION APPARATUS AND METHODS", filed May 7, 2012, and a co-owned U.S. patent application Ser. No. 13/488,106, entitled "SPIKING NEURON NETWORK APPARATUS AND METHODS", filed Jun. 4, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Innovation

The present innovation relates generally to artificial neural networks and more particularly in one exemplary aspect to computer apparatus and methods for pulse-code neural network processing of sensory input.

2. Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary embodiments of such encoding are described in commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety.

Typically, artificial spiking neural networks, such as the network 100 shown for example in FIG. 1, may comprise a plurality of units (or nodes) 102, which correspond to neurons in a biological neural network. Any given unit 102 may be connected to many other units via connections 104, also referred to as communications channels, or synaptic connections. The units providing inputs to any given unit (e.g., the unit 102_2 in FIG. 1) are commonly referred to as the pre-synaptic units (e.g., the units 102_1 in FIG. 1), while the unit receiving the inputs (e.g., the unit 102_2 in FIG. 1) is referred to as the post-synaptic unit.

In the network 100, networks inputs to neurons 102 may be delivered as temporal events via the connections 104. Each of the unit-to-unit connections may be assigned, inter alia, a connection efficacy, which in general refers to a magnitude and/or probability of input spike influence on neuronal response (i.e., output spike generation or firing), and may comprise, for example a parameter—synaptic weight—by which one or more state variables of post synaptic unit are changed. During operation of the pulse-code network (e.g., the network 100), synaptic weights may be dynamically adjusted using what is referred to as the spike-timing dependent plasticity (STDP) in order to implement, among other things, network learning. In some implementations, larger weights may be associated with a greater effect a synapse has on the activity of the post-synaptic neuron.

One such plasticity mechanism is illustrated with respect to FIGS. 2-3. Traces 200, 210 in FIG. 2 depict a pre-synaptic input spike train (delivered for example via connection 104_1 in FIG. 1) and post synaptic output spike train (generated, for example, by the neuron 102_1 in FIG. 1), respectively.

Properties of the connections 104 (such as weights w) are typically adjusted based on relative timing between the pre-synaptic input (e.g., the pulses 202, 204, 206, 208 in FIG. 2) and post-synaptic output pulses (e.g., the pulses 214, 216, 218 in FIG. 2). One typical STDP weight adaptation rule is illustrated in FIG. 3, where the rule 300 depicts synaptic weight change $\Delta w$ as a function of the time difference between the time of post-synaptic output generation and arrival of pre-synaptic input $\Delta t = t_{post} - t_{pre}$. In some implementations, synaptic connections (e.g., the connections 104 in FIG. 1) delivering pre-synaptic input prior to the generation of post-synaptic response are potentiated or increased (as indicated by $\Delta w > 0$ associated with the curve 302), while synaptic connections (e.g., the connections 104 in FIG. 1) delivering pre-synaptic input subsequent to the generation of post-synaptic response are depressed (as indicated by $\Delta w < 0$ associated with the curve 304 in FIG. 3). By way of illustration, when the post-synaptic pulse 208 in FIG. 2 is generated: (i) connection associated with the pre-synaptic input 214 precedes the output pulse (indicated by the line denoted 224) and it is potentiated ($\Delta w > 0$ in FIG. 3 and the weight is increased); and (ii) connections associated with the pre-synaptic input 216, 218 that follow are depressed ($\Delta w < 0$ in FIG. 3 and the weights are decreased).

In some existing plasticity implementations, connections that deliver inputs prior to generation of post-synaptic response (e.g., the rule 304 in FIG. 3) are potentiated. Accordingly, a neuron (e.g., the neuron 102_4 in FIG. 1) may acquire a synapse (e.g., the connection 104_1 in FIG. 1) that is sufficiently strong (e.g., is characterized by high efficacy) to cause the neuron to generate post-synaptic response regardless of inputs received via other connections. As a result, the connection 104_1 may be kept from being potentiated (in agreement with, for example, the STDP curve 403 in FIG. 3). This may generate a positive feedback loop of one or more connections, thereby causing infinite growth of their synaptic weights. Such positive feedback and uncontrolled synapse efficacy growth is often undesirable, as it may cause network instability, excessive post-synaptic responses, and general failure of the network.

Some existing solutions utilize a weight cap configured to restrict connection efficacy growth. However, generalized cap selection is not often straightforward, as different cap values may result in completely different dynamical regimes of the network. Moreover, translating network tasks (e.g., image encoding) into connection weights, particularly when varying the input, is not well understood.

Consequently there is a salient need for improved mechanisms to produce a spiking neuron network capable of operating in a wide variety of input and network dynamic regimes.

SUMMARY OF THE DISCLOSURE

The present disclosure satisfies the foregoing needs by providing, inter alia, apparatus and methods for enhancing performance of a neural network.

In one aspect of the present invention, a method of operating a connection configured to communicate an input to an artificial spiking neuron is disclosed. In one embodiment, the method includes: (i) determining an efficiency associated with operating the connection in accordance with a first plasticity mechanism, and (ii) based at least in part on an indication, operating the connection in accordance with a second plasticity mechanism. The indication is based at least in part on a comparison of the efficiency to a target efficiency.

In a second aspect of the present invention, a computerized apparatus is disclosed. In one embodiment, the computerized apparatus includes a storage medium, the storage medium including a plurality of executable instructions. The executable instructions are configured to, when executed, adjust an efficiency of a connection associated with at least one spiking neuron by at least: (i) when the efficiency is below a target value, configuring an efficacy adjustment of the connection in accordance with a first mechanism, and (ii) when the efficiency is above the target value, configuring the efficacy adjustment in accordance with a second mechanism at least partly different than the first mechanism.

In another embodiment, the computerized apparatus includes a computerized spiking neural network apparatus including a storage medium. The storage medium includes a plurality of instructions configured to, when executed, implement dynamic control of responses of a neuron of the neural network to feed-forward stimulus received by the neuron via a plurality of connections by at least: (i) for at least one of the plurality of connections that provides at least a portion of the stimulus, applying a first plasticity mechanism, and (ii) based at least in part on an indication, applying a second plasticity mechanism different than the first. The first and second mechanisms cooperate to effectuate the dynamic control.

In a third aspect of the invention, a method for determining a plasticity condition in an artificial spiking neural network is disclosed. In one embodiment, the method includes: (i) identifying at least one neural connection; (ii) determining a target connection efficiency; (iii) selecting a rule to enforce the target connection efficiency; and (iv) applying at least the one rule to the at least one neural connection.

In a fourth aspect of the invention, a system is disclosed. In one embodiment, the system includes: (i) one or more neurons; and (ii) a plurality of connections, the connections interlinking the one or more neurons. The plurality connections each having associated therewith a weight, the weight indicating a probability of response. At least one individual one of the plurality of connections is configured to: (i) implement a first plasticity mechanism related to alteration of its associated weight, and (ii) in response to an indicator, implement a second plasticity mechanism in place of the first plasticity mechanism.

In a fifth aspect of the invention, a method of operating a spiking neuronal network is disclosed. In one embodiment, the method includes using a target efficiency and a measured efficiency to govern, inter alia, use of one or more plasticity rules.

Further features of the present disclosure, its nature and various advantages will be more apparent from the accompanying drawings and the following detailed description.

Figure 1:
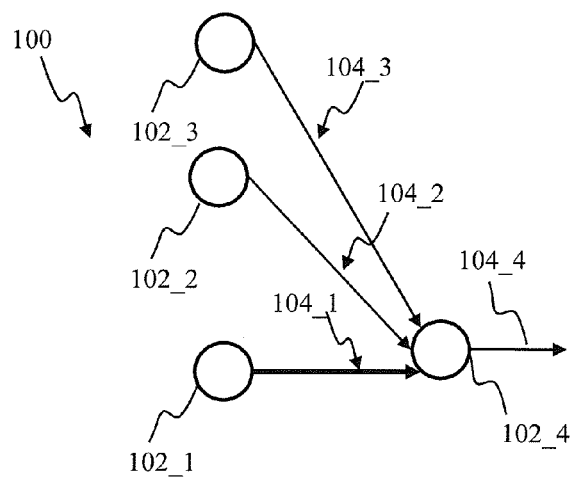
FIG. 1 is a block diagram depicting an artificial spiking neural network according to the prior art.
Figure 2:
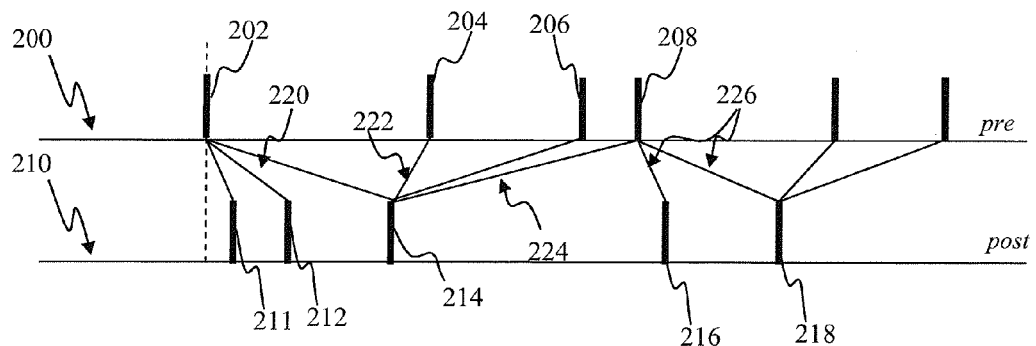
FIG. 2 is a graphical illustration depicting spike timing in the spiking network of FIG. 1, according to the prior art.
Figure 3:
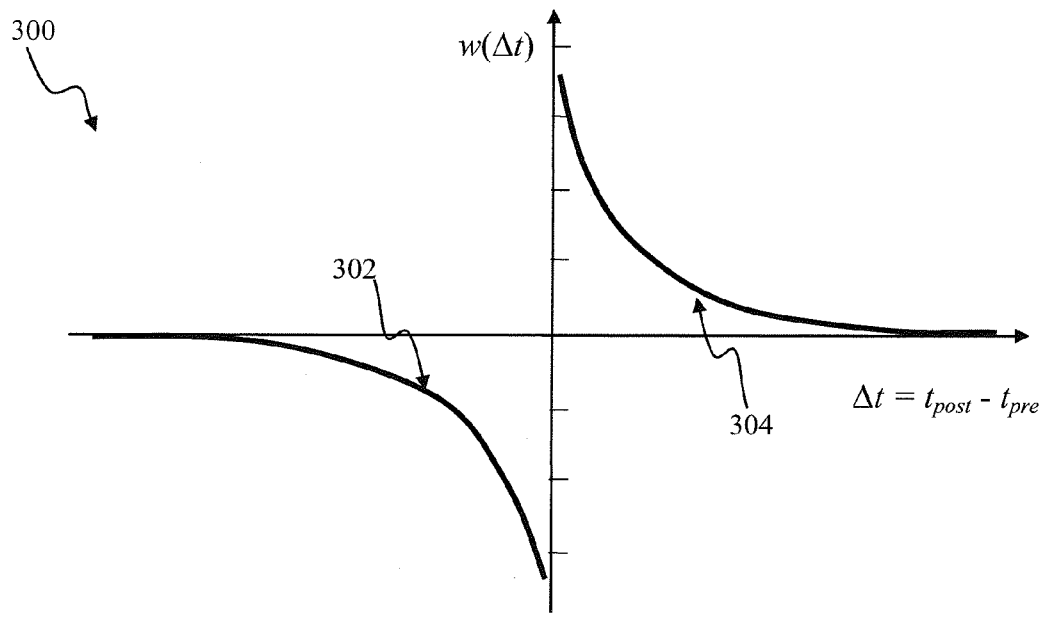
FIG. 3 is a plot depicting spike time dependent plasticity (STDP) spike timing in the spiking network of FIG. 1, according to the prior art.

All Figures disclosed herein are © Copyright 2012 Brain Corporation. All rights reserved.

DETAILED DESCRIPTION

Embodiments and implementations of the present innovation will now be described in detail with reference to the drawings, which are provided as illustrative examples so as to enable those skilled in the art to practice the disclosure. Notably, the figures and examples below are not meant to limit the scope of the present disclosure to a single embodiment or implementation, but other embodiments and implementations are possible by way of interchange of or combination with some or all of the described or illustrated elements.

Wherever convenient, the same reference numbers will be used throughout the drawings to refer to same or like parts.

Where certain elements of these embodiments or implementations can be partially or fully implemented using known components, only those portions of such known components that are necessary for an understanding of the present disclosure will be described, and detailed descriptions of other portions of such known components will be omitted so as not to obscure the innovation.

In the present specification, an embodiment or implementations showing a singular component should not be considered limiting; rather, the invention is intended to encompass other embodiments or implementations including a plurality of the same component, and vice-versa, unless explicitly stated otherwise herein.

Further, the present invention encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (e.g., IrDA).

Overview

The present disclosure provides, in one salient aspect, apparatus and methods for implementing conditional plasticity mechanisms configured to, inter alia, reduce uncontrolled potentiation of connections in artificial spiking neuron networks, without requiring hard-limiting of weights.

In one or more implementations, the conditional plasticity mechanism may be based on an efficiency of a connection (e.g., synapse). For example, connection efficiency $S_{ef}$ may be determined as a ratio of a number of input (pre-synaptic) spikes $N_{fire}$ delivered to a neuron via the connection that are followed by neuron response (e.g., post-synaptic spike) generation, to the total number of input spikes $N_{tot}$ delivered to the neuron via the connection.

The dynamical parameter $S_{ef}$ may be used to estimate efficiency of a synapse in driving the post-synaptic neuron. Accordingly, $S_{ef}$ may provide information of whether the connection is weak or strong (e.g., the synaptic weight is large or small). Connection strength evaluation based on connection efficiency $S_{ef}$ is more desirable as opposed approaches of the prior art that rely on the weight value. Accordingly, depending on the current neuron state (e.g., neuron excitability) and/or activity on other synapses, a pre-synaptic input via a particular connection may cause the neuron to spike, even when the synaptic weight of this connection is relatively low. Conversely, when neuron excitability is low (and/or the neuron may be inhibited), a pre-synaptic input may not cause neuronal post-synaptic response even when the synaptic weight is comparatively higher.

Since the connection weights are plastic and may change, the connection efficiency $S_{ef}$ is therefore not fixed, and may change as a result of input and output activity of a neuron. In one or more implementations, the connection plasticity (e.g., STDP) may be configured to maintain a target value of the connection efficiency $S_{ef}$.

In one or more implementations, the actual value of the connection efficiency may be compared to the target efficiency. The various connections of the same neuron may be configured each with the same target efficiency, each with different target efficiencies, or some mixture thereof. A connection may be updated using a spike-timing dependent plasticity rule; e.g., a pre-synaptic portion and a post-synaptic portion. The STDP rule may comprise for instance a long term depression (LTD) rule or a long term potentiation (LTP) rule. For example, the pre-synaptic portion may comprise the long term LTD rule, and the post-synaptic portion may comprise the LTP rule. When the actual connection efficiency is below or above a target value, a first or second STDP rule may be applied respectively. The first STDP rule may comprise for instance an increased LTP resulting in, inter alia, stronger connection potentiation, or alternatively a decreased LTD, resulting in, inter alia, weaker connection depression. The foregoing two approaches may also be combined, thereby producing higher connection efficacy.

Similarly, the second STDP rule may comprise an increased LTD resulting in, inter alia, stronger connection depression, or alternatively an increased LTP, resulting in, inter alia, stronger connection potentiation. These two latter approaches may also be combined, thereby producing lower connection efficacy.

In some implementations, when the actual connection efficiency is above the target value, the LTD rule of the STDP may be increased, resulting in, inter alia, stronger connection depression.

In another aspect of the disclosure, connection adjustment methodologies are used to implement processing of visual sensory information and feature/object recognition using spiking neuronal networks. Portions of the object recognition apparatus can be embodied for example in a remote computerized apparatus (e.g., server), comprising a computer readable apparatus.

Embodiments of the foregoing feature detection functionality of the present disclosure are useful in a variety of applications including for instance a prosthetic device, autonomous robotic apparatus, and other electromechanical devices requiring visual or other sensory data processing functionality.

Conditional Plasticity

Detailed descriptions of the various embodiments and implementations of the apparatus and methods of the disclosure are now provided. Although certain aspects of the disclosure can best be understood in the context of the visual and sensory information processing using spiking neural networks, the disclosure is not so limited, and implementations of the disclosure may also be used in a wide variety of other applications, including for instance in implementing connection adaptation in pulse-code neural networks.

Implementations of the disclosure may be for example deployed in a hardware and/or software realization of a neuromorphic computer system. In one such implementation, a robotic system may include a processor embodied in an application specific integrated circuit, which can be adapted or configured for use in an embedded application (such as a prosthetic device).

Generalized Framework

Figure 4:
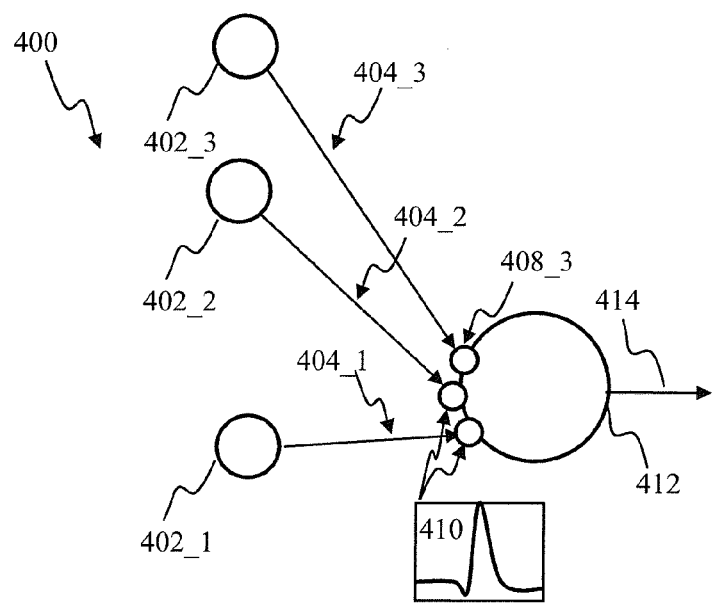
FIG. 4 is a block diagram depicting an artificial spiking neural network comprising conditional plasticity mechanism according to one implementation of the disclosure.

FIG. 4 illustrates one exemplary implementation of a spiking neuronal network of the disclosure, configured to process sensory information using conditional plasticity. The network 400 comprises a plurality of pre-synaptic spiking neurons 402, configured to deliver feed-forward spiking input to the post-synaptic neuron 412 via connections 404. The neuron 414 may generate output (e.g., a post-synaptic spike) such as for example those described in co-owned and co-pending U.S. patent application Ser. No. 13/152,105 filed on Jun. 2, 2011, and entitled "APPARATUS AND METHODS FOR TEMPORALLY PROXIMATE OBJECT RECOGNITION", incorporated by reference herein in its entirety. The output spikes of the neuron 412 may be propagated via a connection 414. Post-synaptic spike generation is well-established in the spiking network arts, and accordingly will not be described in detail herein for brevity and clarity of presentation of the inventive aspects of the present disclosure.

The connections 404_1, 404_2, 404_3 may be characterized by connection efficacy (e.g., connection weight 408). Efficacy may refer to a magnitude and/or probability of input spike influence on neuronal response (i.e., output spike generation or firing), and may comprise, for example a parameter—synaptic weight (408 in FIG. 4)—by which one or more state variables of post synaptic unit are changed.

Contrasted with the prior art network 100 described with respect to FIG. 1 supra, the exemplary inventive network 400 of FIG. 4 comprises a conditional plasticity mechanism 410. In one or more implementations, the conditional spike-timing dependent plasticity (STDP) mechanism 410 may be configured based on connection efficiency; e.g., as a ratio of a number of input spikes $N_{fire}$ delivered to a neuron via the connection that are followed by neuron response generation (e.g., neuron firing post-synaptic spike) to the total number of input spikes $N_{tot}$ delivered to the neuron via the connection, as set forth In Eqn. 1 below:

$$S_{ef} = \frac{N_{fire}}{N_{tot}} = \frac{N_{fire}}{N_{fire} + N_{idle}}, N_{tot} = N_{fire} + N_{idle} \qquad \text{(Eqn. 1)}$$

where $N_{idle}$ is the number of input spikes that did not cause the (specified) post-synaptic response. It will be appreciated that the $N_{fire}$ value (and hence the other values) may also be defined in terms of a desired or specified response (versus any response).

Figure 5:
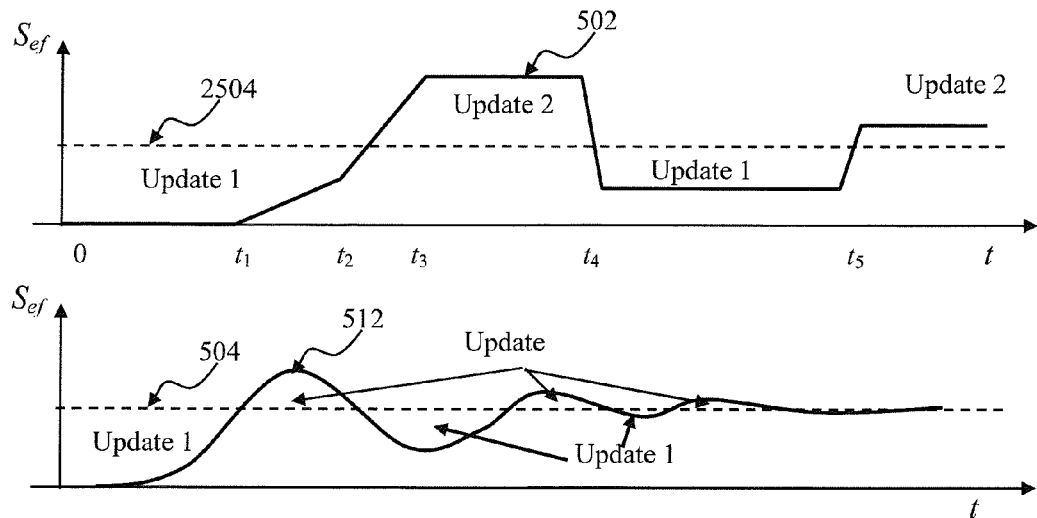
FIG. 5 is a graphical illustration depicting a target efficiency-based conditional plasticity mechanism useful with the network of FIG. 4, according to one implementation.

Since the connection weights are plastic and may constantly change, the connection efficiency $S_{ef}$ is therefore not fixed, and may change as a result of input and output activity of a neuron, as illustrated in FIG. 5.

In one or more implementations, the actual value of the connection efficiency, depicted by the curve 502 in FIG. 5, may be compared to the target efficiency, depicted by the broken line 504 in FIG. 5. In one or more implementations, the connection plasticity rule (e.g., the conditional STDP rule 410 of FIG. 4) may be configured to maintain a target value of the connection efficiency, as illustrated by the curve 512 in FIG. 5.

In some implementations, an instantaneous value of actual connection efficiency may be evaluated for one or more input spikes delivered through the connection, and/or for one or more output spikes generated by the neuron. A running average of $S_{ef}$ may also be used for the conditional plasticity mechanism. In some implementations, a running mean of the input and/or output activity may be used as follows:

$$(S^{out})=\Sigma_{out}\delta(t-t^{out}), (S^{in})=\Sigma_{in}\delta(t-t^{in}) \quad \text{(Eqn. 2)}$$

where f=1, 2, ..., N is the spike designator within the running window of length T, and δ(.) is the Dirac function with δ(t)=0 for t≠0 and $$\int_{-\infty}^{\infty}\delta(t)dt=1 \quad \text{(Eqn. 3)}$$

In some implementations, when the actual connection efficiency is below target value, a first STDP rule may be applied, as depicted by the 'Update 1' designator in FIG. 5. When the actual connection efficiency is above the target value, a second STDP rule may be applied, as depicted by the 'Update 2' designator in FIG. 5.

The first STDP rule may comprise for instance an increased LTP resulting in, inter alia, stronger connection potentiation, or alternatively a decreased LTD resulting in, inter alia, weaker connection depression. The above two approaches may also be combined if desired, thereby producing higher connection efficacy.

Similarly, the second STDP rule may comprise an increased LTD resulting in, inter alia, stronger connection depression, or alternatively an increased LTP resulting in, inter alia, stronger connection potentiation. The two latter approaches may also be combined, thereby producing lower connection efficacy.

In some implementations, when the actual connection efficiency is above the target value, the LTD rule of the STDP may be increased, resulting in, inter alia, stronger connection depression. In some implementations, when the actual connection efficiency is above the target value, the LTP rule of the STDP may be decreased, resulting in, inter alia, weaker connection potentiation.

Figure 6A:
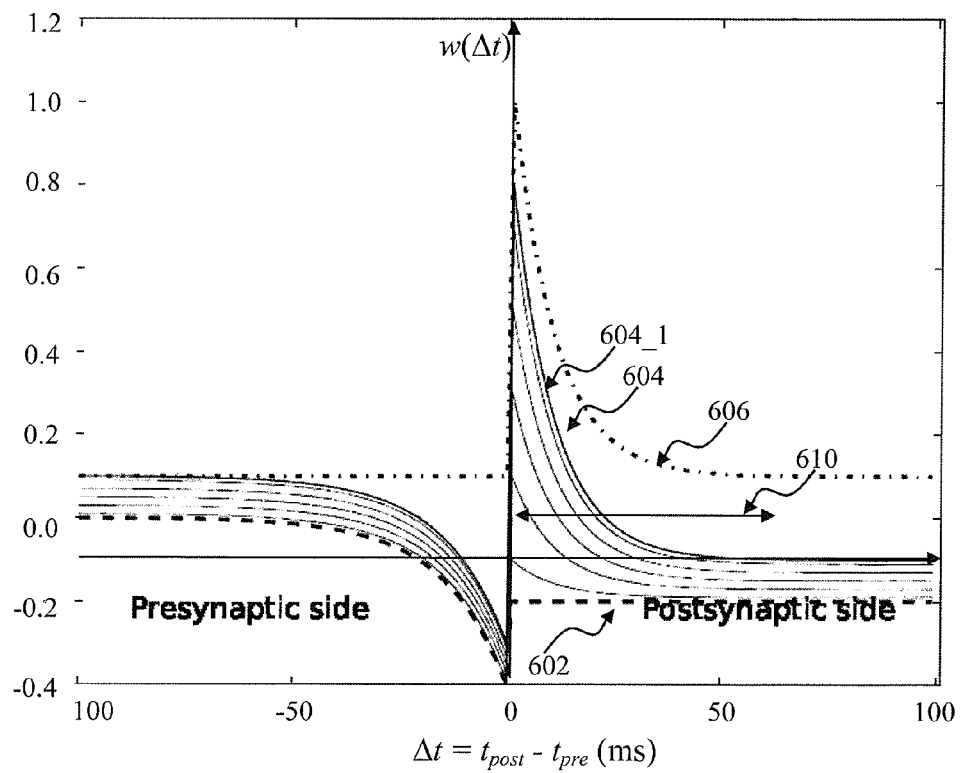
FIG. 6A is a plot illustrating spike-time dependent plasticity rules useful with the conditional plasticity mechanism of FIG. 4, in accordance with one implementation.
Figure 6B:
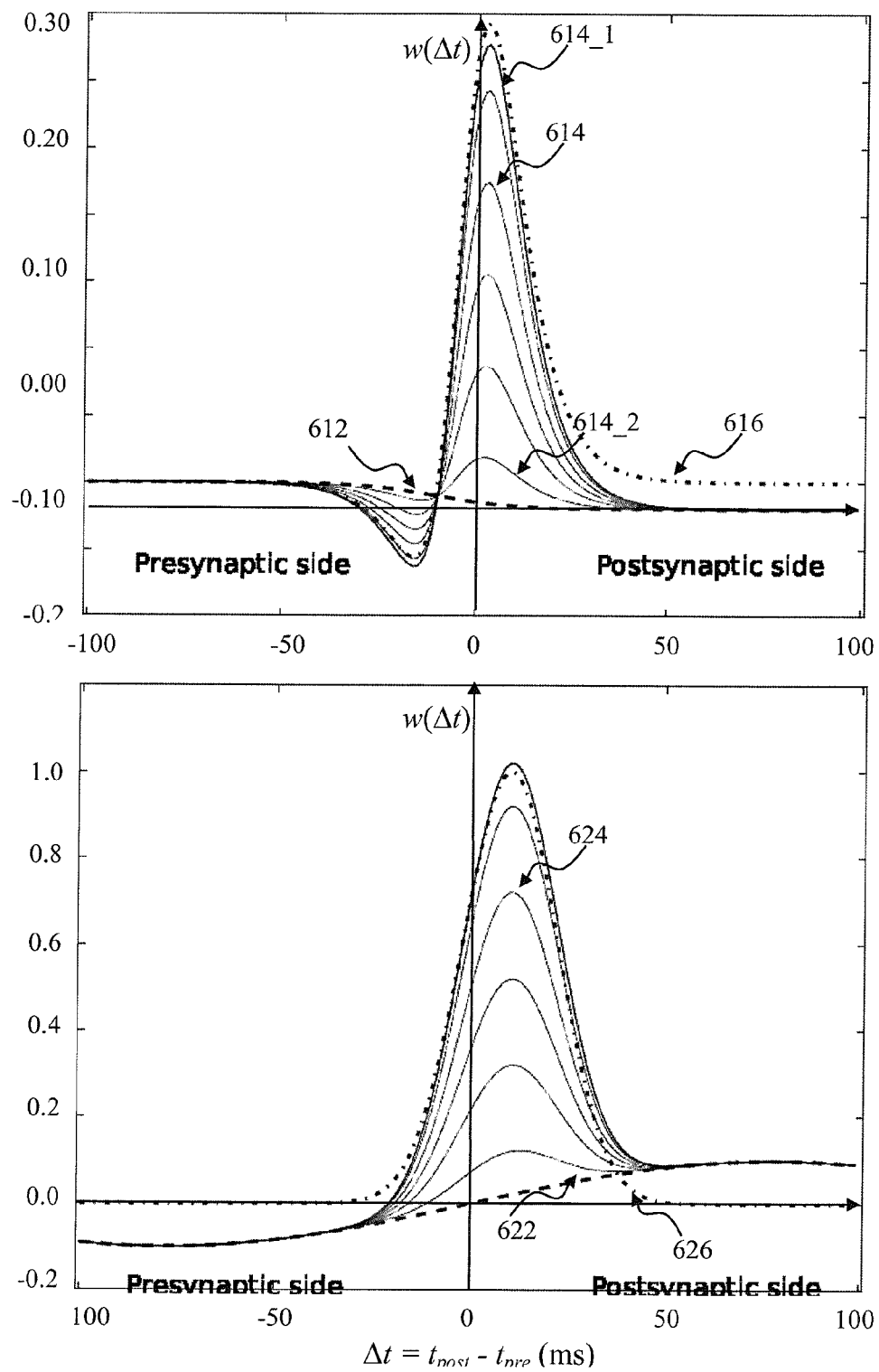
FIG. 6B is a plot illustrating spike-time dependent plasticity rules useful with the conditional plasticity mechanism of FIG. 4, in accordance with other implementations.

FIGS. 6A-6B illustrate exemplary STDP rules useful with conditional plasticity mechanism described herein. The curve 602 in FIG. 6A depicts the fixed portion $E_u$ of the plasticity update. Several solid curves 604 depict the variable portion $E_m$ of the plasticity update, corresponding to different amount of potentiation and/or depression that may be used to configure plasticity of connections (e.g., the connections 404 in FIG. 4). Thus, the variable portion of conditional STDP update rule may be modulated (i.e., varied) as shown in FIG. 6A by the different magnitude of the curves within the LTP group 604. In some implementations, the modulation may be effectuated based on the connection efficiency. Specifically, in one such case, the update (e.g., the Update 1 in FIG. 5) may comprise the variable portion $E_v$ (the curve group 604 in FIG. 6A) rule that is configured based on a difference measure between the target efficiency and actual efficiency of the connection:

$$E_m \propto S_{ef}-S_{targ} \quad \text{(Eqn. 4)}$$

Accordingly, the broken curve 606 of FIG. 6A depicts the cumulative modulated STDP rule configured as a sum of the curve 602 portion and the portion of the corresponding curve of group 604:

$$E_i=E_u+\beta E_{m,i}, \beta=[0 \ldots 1] \quad \text{(Eqn. 5)}$$

Similarly, the cumulative modulated STDP rules illustrated by the curves 616, 626 in FIG. 6B may comprise the un-modulated portion (the curves 612, 622) and modulated portion (the curve groups 614, 624). The implementation depicted by the cumulative modulated STDP rule of curve 616 in FIG. 6B, comprises long term potentiation on both pre-synaptic and post-synaptic sides as |Δt| increases. The implementation depicted by the cumulative modulated STDP rule of curve 616 in FIG. 6B, comprises long term potentiation on the post-synaptic side as Δt increases. In some implementations, the cumulative modulated STDP rule may comprise long term depression on the pre-synaptic side as Δt decreases, as shown by curve 626 in FIG. 6B.

In one or more implementations, the un-modulated portion $E_v$ of STDP (e.g., the curves 602, 612, 622 in FIGS. 6A-6B) may correspond to the connection reaching the target efficiency. The un-modulated portion may also be for example slightly negative, thereby effectuating a small amount of connection depression in order to prevent sudden weight growth due to an errant input spike.

In some implementations, the un-modulated portion $E_m$ of STDP (e.g., the curves 604, 614, 624 in FIGS. 6A-6B) may correspond the a regular plasticity rule, such as described, for example, in U.S. patent application Ser. No. 13/488,106, entitled "SPIKING NEURON NETWORK APPARATUS AND METHODS, previously incorporated herein. In other cases, such as the implementation illustrated by Eqn. 5, the modulated portion is tuned by the parameter β. The modulation parameter β may be varied for instance in the range from zero to one during network operation. In one such implementation, the modulation parameter may be set to one (1) at the beginning of the operational run (corresponding to zero initial connection efficiency), thereby providing maximum (for the given conditional STDP rule) amount of plasticity adjustment (e.g., the curve 614_1 in FIG. 6B). As the connection may be gradually potentiated, the connection efficiency $S_{ef}$ may approach the target value (e.g., the level 504 in FIG. 5). Accordingly, the modulation parameter β may be reduced to zero, thereby diminishing the amount of plasticity adjustment due to the modulated term in Eqn. 5.

In some implementations, the modulated portion of the conditional plasticity rule (e.g., the curve groups 604, 614, 624 in FIGS. 6A-6B) may be obtained by varying time delay Δt by i×dt as:

$$E_{i,m}(\Delta t)=E_{i,m}(idt+\Delta t) \quad \text{(Eqn. 6)}$$

where dt is a delay increment.
The realization of Eqn. 6 may be interpreted in some cases as shifting one of the curves within the modulated portion (e.g., the curve 604_1 in FIG. 6A) along the horizontal Δt axis.

Exemplary Implementations

In one or more exemplary implementations, the conditional plasticity updates discussed above may be effectuated based on one or more events. For instance, Elementary Network Description events may be utilized as described in detail in a co-pending and co-owned U.S. patent application Ser. No. 13/239,123, entitled "ELEMENTARY NETWORK DESCRIPTION FOR NEUROMORPHIC SYSTEMS", filed Sep. 21, 2011, incorporated herein in its entirety. As described therein, the dynamics of a given neural connection may be divided into pre-synaptic and post-synaptic events. The pre-synaptic event may be triggered for example when the synapse delivers its input to the neuron. The post-synaptic event may be triggered for example when the neuron generates post-synaptic output.

In one or more implementations of the present disclosure, the connection (e.g., connection 404 in FIG. 4) may be configured using a parameter $E_{ef}$, configured to describe event-based connection efficacy. The parameter $E_{ef}$ may evolve in any number of ways, such as for example the following:

when a pre-synaptic event occurs, the parameter $E_{ef}$ may decay with time as follows:

$$E_{ef}=E_{ef}\alpha \quad \text{(Eqn. 7)}$$

where α<1 is the decay rate;

when a post-synaptic event occurs, the parameter $E_{ef}$ may be incremented by an amount, which depends on the time interval ($t_{post}-t_{pre}$) between the pre-synaptic input and the post-synaptic spike:

$$E_{ef}=E_{ef}+H(t_{post}-t_{pre}). \quad \text{(Eqn. 8)}$$

In one particular implementation, the adjustment of Eqn. 8 may be configured as follows:

$$H(\Delta t)\begin{cases} 1; & \Delta t \leq C \\ 0; & \Delta t > C, \end{cases} \quad \text{(Eqn. 9)}$$

where C is an time window during which pre-synaptic input activity is monitored, shown by the arrow 610 in FIG. 6A. The function H(Δt) in Eqn. 8 may Eqn. 9Eqn. 9 encode the amount of 'influence' the connection (e.g., the connection 404_1 in FIG. 4) may have had on the post-synaptic response generation by the neuron (e.g., the neuron 412 in FIG. 4).

In one or more implementations, when the connection may be active within the time window C (prior to the post-synaptic response $t_{post}$), the connection efficacy may be increased (H=1); otherwise the connection efficacy remains unchanged (H=0). As will be appreciated by those skilled in the arts, the above implementation (i.e. Eqn. 9) Eqn. 9Eqn. 9 comprises just one example, and many other realizations (e.g., H(Δt) comprising integrable function having potentiation and/or depression branches) may be used as well.

By way of example, if the number of input spikes ($N_{fire}$ of Eqn. 1) that are followed by neuron response generation, comprise the fraction p of the total number $N_{tot}$ of input spikes, the corresponding value of $E_{ef}$ may be determined using the following expression:

$$E_{ef}=\alpha 1/p \cdot E_{ef}+1. \quad \text{(Eqn. 10)}$$

In one or more implementations, Eqn. 10 may be interpreted as follows: 1 case when pre-synaptic input may cause post-synaptic response, are accompanied by 1/p cases when the it does not (although the connection is active, i.e. communicated the pre-synaptic input). By way of example, if p=0.1 and α=0.9, Eqn. 10 may become:

$$E_{ef}=0.9^{10} \cdot E_{ef}+1 \approx 0.35 E_{ef}+1$$

$$(1-0.35)\cdot E_{ef} \approx 1,$$

$$E_{ef} \approx 1.53. \quad \text{(Eqn. 11)}$$

In one or more implementations, the solution of Eqn. 10 may be expressed as:

$$E_{ef} = \frac{1}{1-\alpha^{2/p}}. \quad \text{(Eqn. 12)}$$

In some implementations, Eqn. 12 may be used to determine a general relationship between the actual fraction p and the steady state of the running average $E_{ef}$.

Other functional dependencies of H(Δt) in Eqn. 8 may be used as well. In one or more implementations, an integral equation may be used to describe a time evolution of $E_{ef}$. The time evolution of $E_{ef}$ may depend for instance on the fraction p of time the connection is effective, and/or on pairwise distribution of pre-synaptic ($t_{pre}$) and post-synaptic ($t_{post}$) spike timing. In one implementation, the timing distribution may be characterized using a probability distribution θ(Δt), and the equilibrium value of $E_{ef}$ may be determined using a solution to the following integral equation:

$$E_{ef}=\alpha^{\int(1-H(\delta\tau)d\theta(\delta\tau))} \cdot E_{ef} + \int H(\delta\tau)d\theta(\delta\tau) \quad \text{(Eqn. 13)}$$

It will be appreciated by those skilled in the arts that other plasticity curves (or yet other types of relationships) may be used with the approach of the present disclosure, including for example non-symmetric rules (e.g., as described in co-pending and co-owned U.S. patent application Ser. No. 13/465,924, entitled "SPIKING NEURAL NETWORK FEEDBACK APPARATUS AND METHODS", incorporated supra). Furthermore, other super-threshold plasticity curves and/or other types of relationships may be used with the approach of this disclosure, including for example "slight" potentiation—i.e., configuration of the pre-synaptic update with an amplitude that is lower than the depression of the post-synaptic update.

Exemplary Methods

Figure 7:
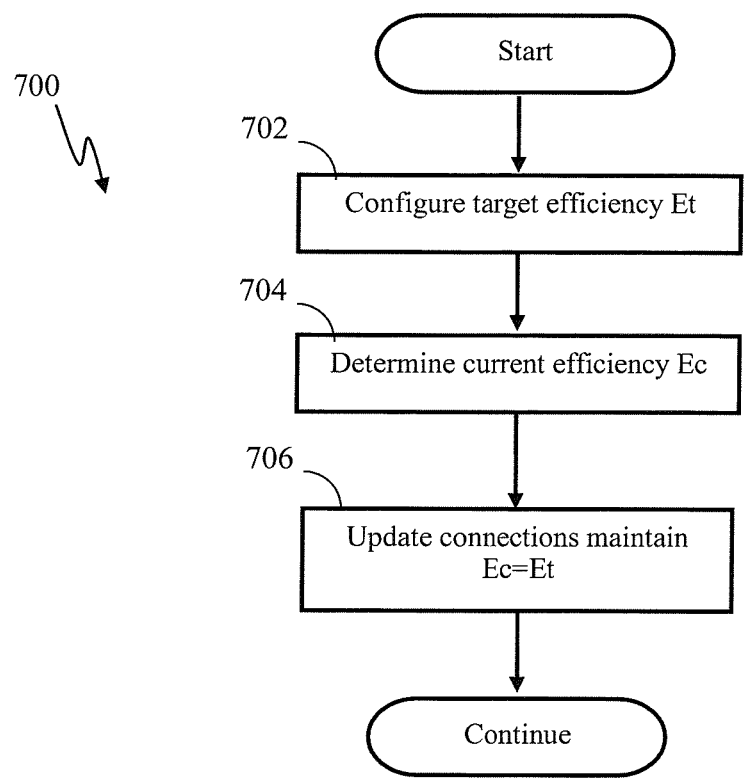
FIG. 7 is a logical flow diagram illustrating a generalized conditional plasticity update, in accordance with one implementation.
Figure 8:
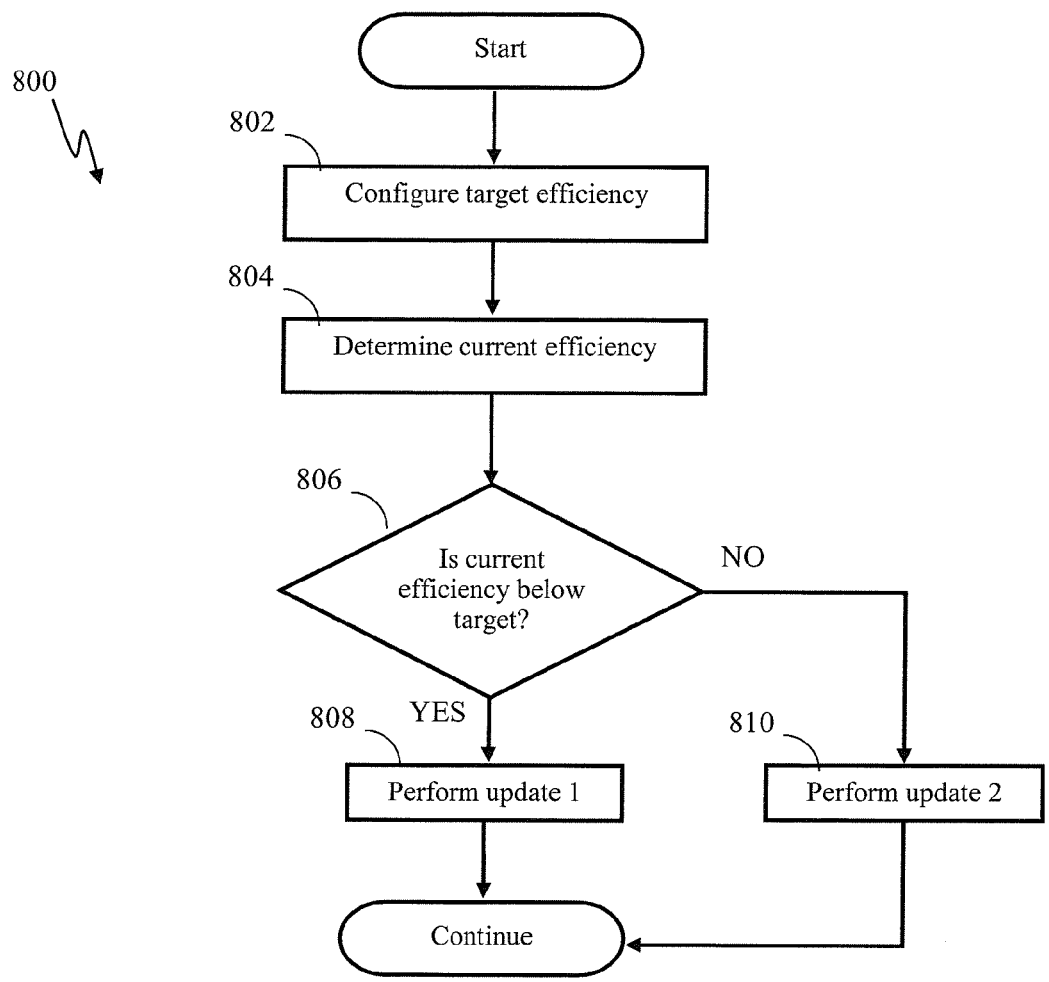
FIG. 8 is a logical flow diagram illustrating a generalized method of conditional plasticity update based on target connection efficiency, in accordance with one implementation.
Figure 9:
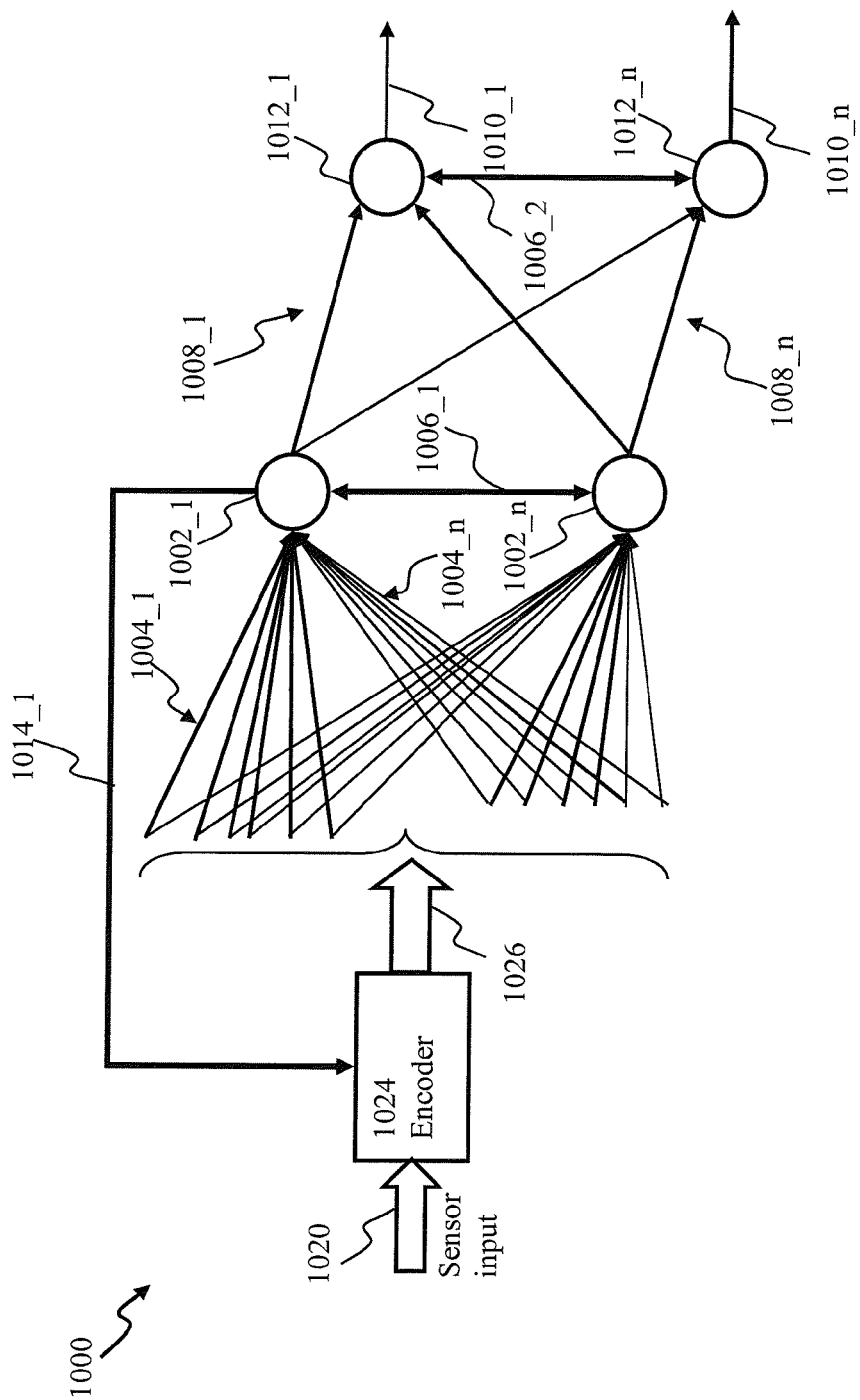
FIG. 9 is a block diagram illustrating a sensory processing apparatus configured to implement conditional plasticity mechanism in accordance with one implementation.

Referring now to FIGS. 7-9, exemplary implementations of conditional plasticity-based methods according to the disclosure are described. In some implementations, the methods of FIGS. 7-9 may be used, for example, for operating the neurons 402, 412 of FIG. 4. Moreover, methods of FIG. 7-9 may be implemented in a connection (e.g., the connection 404 of FIG. 4). The methods of FIG. 7-9 may also be implemented in sensory processing apparatus, comprising one or more spiking neuron networks as described with respect to FIG. 9, infra, thereby advantageously aiding, inter alia, stable operation of network, and preventing runaway connection potentiation.

FIG. 7 is a logical flow diagram illustrating achieving target connection efficiency using conditional plasticity update, in accordance with one or more implementations. At step 702 of method 700, target efficiency of a connection may be configured. In some implementations, the target efficiency may comprise a network/synapse parameter and be established at the beginning of network execution. In one or more implementations, the target efficiency may be dynamically adjusted based, for example, on network power consumption and/or other parameters.

At step 704 of the method 700, a current value of connection efficiency may be determined using any of the methodologies described herein. In some implementations, the efficiency may be determined using a number of input spikes delivered in to a neuron via the connection that follow by a response (spike) generated by the neuron within a time interval). The number of input spikes may be low-pass filtered if desired using, for example, an exponential filter, a running mean, and/or a weighted running average of the input spike train. Similarly, in some implementations, the number of neuron responses may be low-pass filtered.

At step 706, the connection is adjusted in order to achieve target connection efficiency, as described in detail for example with respect to FIG. 5 above, and/or with respect to FIGS. 8-9 below.

In one or more implementations, the current efficiency may be determined using Eqn. 8. The target efficiency may be configured based on a fraction p of the post-synaptic outputs to the pre-synaptic inputs, a steady state value of the efficiency may be determined using, for example, Eqn. 10. The calculated running average efficiency value may be used, in one or more implementations, as the target efficiency. Accordingly, plasticity adjustment described above may be utilized so that current efficiency value does not exceed the steady state (target) efficiency.

FIG. 8 illustrates a generalized method of conditional plasticity update based on target connection efficiency, in accordance with one or more implementations. At step 802 of method 800, target efficiency of a connection may be configured.

At step 804 of the method 800, a current value of connection efficiency may be determined using any of the methodologies described herein.

At step 806, a check may be performed whether the current efficiency is below the target efficiency value. When the current efficiency is below the target, the method proceeds to step 808, where the connection may be adjusted in accordance with plasticity Update 1.

When the current efficiency is above the target, the exemplary method proceeds to step 810, where the connection may be adjusted in accordance with plasticity Update 2.

In some implementations, Update 1 and/or Update 2 may comprise plasticity rules, such as those illustrated in FIGS. 6A-6B. The weight adjustment of the modulated portion of Update 1 (e.g., the rule of Eqn. 5) may be increased, and the weight adjustment of the modulated portion of Update 2 may be decreased. Such increase and/or decrease may be effectuated by, for example, increasing/decreasing parameter $\beta$ in Eqn. 5, or by varying the delay $\delta t$ in Eqn. 6. Other implementations may be used, such as for example, a combination of modulation amplitude and delay or switching from one plasticity rule (e.g., the family of curves 604 in FIG. 6A) to another (e.g., the family of curves 614 in FIG. 6B).

In one or more implementations, Update 1 of step 808 of the method 800 may comprise an increased LTP resulting in, inter alia, stronger connection potentiation. In some implementations, the Update 1 STDP rule of step 808 may comprise a decreased LTD resulting in, inter alia, weaker connection depression. The above two approaches may also be combined, thereby producing higher connection efficacy.

In one or more implementations, Update 2 of step 810 of the method 800 may comprise an increased LTD resulting in, inter alia, stronger connection depression. In some implementations, Update 2 of step 810 of method 800 may comprise an increased LTP resulting in, inter alia, stronger connection potentiation. The two latter approaches may also be combined, thereby producing lower connection efficacy.

Exemplary Apparatus

Various exemplary spiking network apparatus implementing one or more of the methods set forth herein (e.g., using the exemplary conditional plasticity mechanisms explained above) are now described with respect to FIGS. 9-11C.

Sensory Processing Apparatus

One exemplary apparatus for processing of sensory information (e.g., visual, audio, somatosensory) using a spiking neural network (including one or more of the conditional plasticity mechanisms described herein) is shown in FIG. 9. The illustrated processing apparatus 1000 includes an input interface configured to receive an input sensory signal 1020. In some implementations, this sensory input comprises electromagnetic waves (e.g., visible light, IR, UV, etc.) entering an imaging sensor array (comprising RGCs, a charge coupled device (CCD), CMOS device, or an active-pixel sensor (APS)). The input signal in this example is a sequence of images (image frames) received from a CCD or CMOS camera via a receiver apparatus, or downloaded from a file. Alternatively, the image may be a two-dimensional matrix of RGB values refreshed at a 24 Hz frame rate. It will be appreciated by those skilled in the art that the above image parameters and components are merely exemplary, and many other image representations (e.g., bitmap, CMYK, grayscale, etc.) and/or frame rates are equally useful with the present disclosure.

The apparatus 1000 may also include an encoder 1024 configured to transform (encode) the input signal so as to form an encoded signal 1026. In one variant, the encoded signal comprises a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 9, different detectors of the same hierarchical layer are denoted by an "_n" designator, such that e.g., the designator 1002_1 denotes the first detector of the layer 1002. Although only two detectors (1002_1, 1002_n) are shown in FIG. 9 for clarity, it is appreciated that the encoder can be coupled to any number of detector nodes that is compatible with the detection apparatus hardware and software limitations. Furthermore, a single detector node may be coupled to any practical number of encoders.

In one implementation, each of the detectors 1002_1, 1002_n contain logic (which may be implemented as a software code, hardware logic, or a combination of thereof) configured to recognize a predetermined pattern of pulses in the encoded signal 1004, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 9, the designators 1008_1, 1008_n denote output of the detectors 1002_1, 1002_n, respectively.

In one implementation, the detection signals are delivered to a next layer of the detectors 1012 (comprising detectors 1012_l, 1012_m, 1012_k) for recognition of complex object features and objects, similar to the exemplary configuration described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this configuration, each subsequent layer of detectors is configured to receive signals from the previous detector layer, and to detect more complex features and objects (as compared to the features detected by the preceding detector layer). For example, a bank of edge detectors is followed by a bank of bar detectors, followed by a bank of corner detectors and so on, thereby enabling alphabet recognition by the apparatus.

Each of the detectors 1002 may output detection (post-synaptic) signals on communication channels 1008_1, 1008_n (with appropriate latency) that may propagate with different conduction delays to the detectors 1012. The detector cascade of the apparatus of FIG. 9 may contain any practical number of detector nodes and detector banks determined, inter alia, by the software/hardware resources of the detection apparatus and complexity of the objects being detected.

The sensory processing apparatus implementation illustrated in FIG. 9 may further comprise lateral connections 1006. In some variants, the connections 1006 are configured to communicate post-synaptic activity indications between neighboring neurons of the same hierarchy level, as illustrated by the connection 1006_1 in FIG. 9. In some variants, the neighboring neuron may comprise neurons having overlapping inputs (e.g., the inputs 1004_1, 1004_n in FIG. 9), so that the neurons may compete in order to not learn the same input features. In one or more implementations, the neighboring neurons may comprise spatially proximate neurons such as being disposed within a certain volume/area from one another on a 3-dimensional (3D) and or two-dimensional (2D) space.

The apparatus 1000 may also comprise feedback connections 1014, configured to communicate context information from detectors within one hierarchy layer to previous layers, as illustrated by the feedback connections 1014_1 in FIG. 9. In some implementations, the feedback connection 1014_2 is configured to provide feedback to the encoder 1024 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Computerized Neuromorphic System

Figure 10:
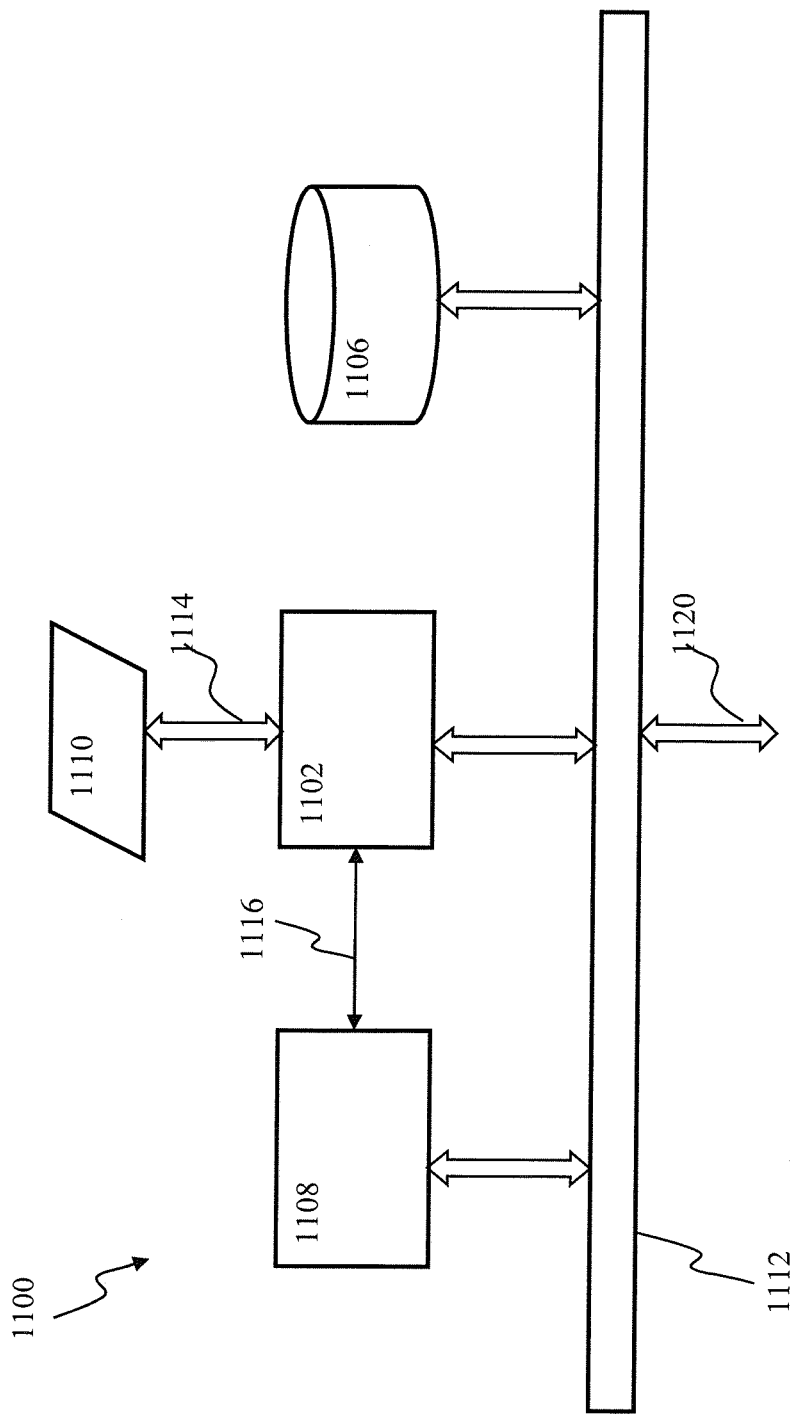
FIG. 10 is a block diagram illustrating a computerized system useful for, inter alia, providing a conditional plasticity mechanism in a spiking network, in accordance with one implementation.

One particular implementation of the computerized neuromorphic processing system, adapted for operating a computerized spiking network (and implementing the exemplary Conditional plasticity methodology described supra), is illustrated in FIG. 10. The computerized system 1100 of FIG. 10 comprises an input interface 1110, such as for example an image sensor, a computerized spiking retina, an audio array, a touch-sensitive input device, etc. The input interface 1110 is coupled to the processing block (e.g., a single or multi-processor block) via the input communication interface 1114. The system 1100 further comprises a random access memory (RAM) 1108, configured to store neuronal states and connection parameters (e.g., weights 408 in FIG. 4), and to facilitate synaptic updates. In some exemplary implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 is coupled to the processor 1102 via a direct connection (memory bus) 1116. The memory 1108 may also be coupled to the processor 1102 via a high-speed processor bus 1112).

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, etc.). The nonvolatile storage 1106 may be used for instance to store state information of the neurons and connections when, for example, saving/loading network state snapshot, or implementing context switching (e.g., saving current network configuration (comprising, inter alia, connection weights and update rules, neuronal states and learning rules, etc.) for later use, and loading of a previously stored network configuration.

In some implementations, the computerized apparatus 1100 is coupled to one or more external processing/storage/input devices via an I/O interface 1120, such as a computer I/O bus (PCI-E), wired (e.g., Ethernet) or wireless (e.g., Wi-Fi) network connection.

In another variant, the input/output interface comprises a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to implementations of the disclosure including, for example, an LCD/LED monitor, touch-screen input and display device, speech input device, stylus, light pen, trackball, end the likes.

Figure 11A:
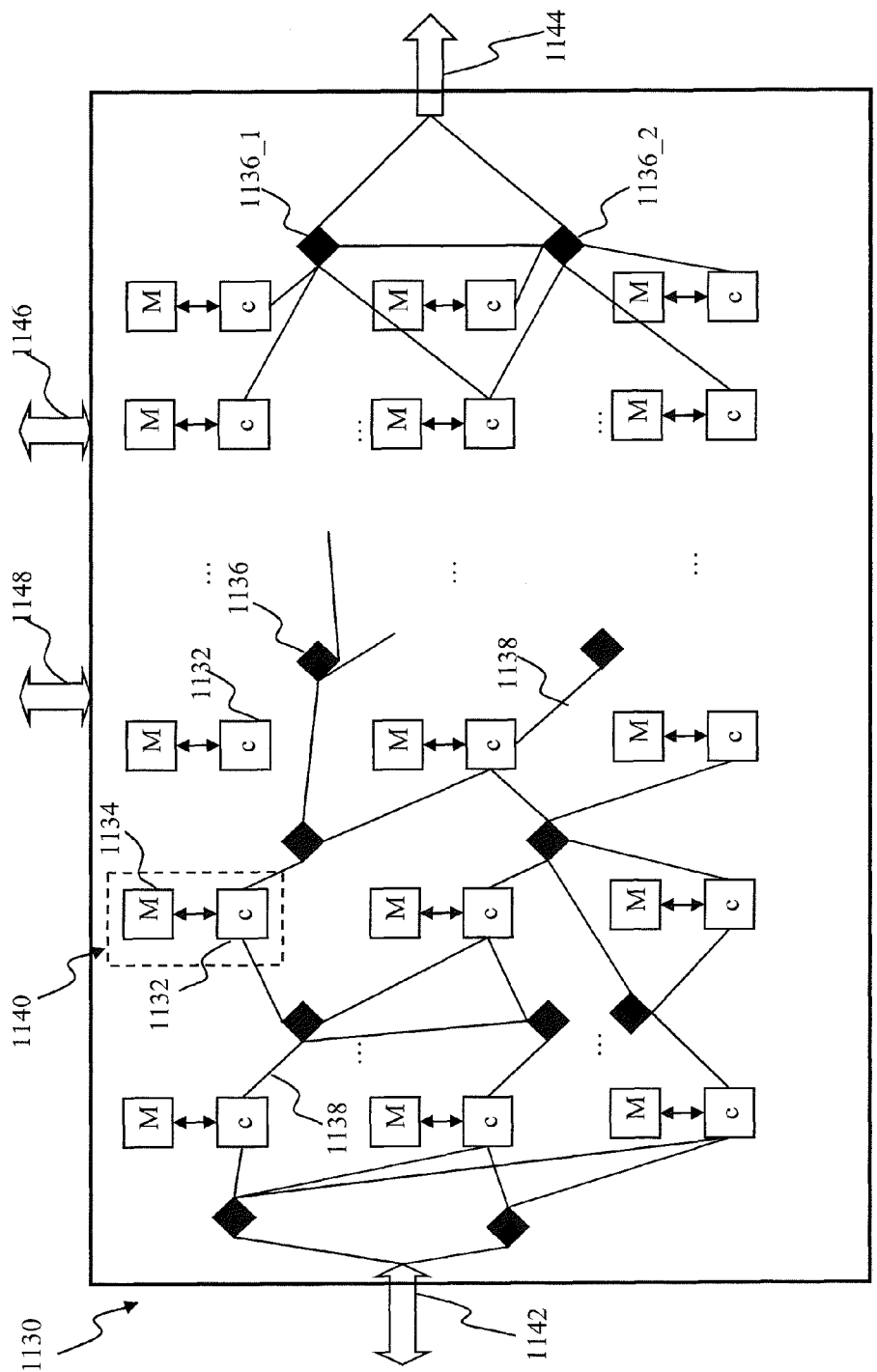
FIG. 11A is a block diagram illustrating a neuromorphic computerized system useful with, inter alia, a conditional plasticity mechanism in a spiking network, in accordance with one implementation.

Referring now to FIG. 11A, one implementation of neuromorphic computerized system configured to implement conditional plasticity mechanism in a spiking network is described in detail. The neuromorphic processing system 1130 of FIG. 11A comprises a plurality of processing blocks (micro-blocks) 1140, where each micro-block comprises a computing logic core 1132 and a memory block 1134. The logic core 1132 is configured to implement various aspects of neuronal node operation, such as the node model, and synaptic update rules (e.g., the I-STDP) and/or other tasks relevant to network operation. The memory block is configured to store, inter alia, neuronal state variables and connection parameters (e.g., weights, delays, I/O mapping) of connections 1138.

The micro-blocks 1140 are interconnected with one another using connections 1138 and routers 1136. As it is appreciated by those skilled in the arts, the connection layout in FIG. 11A is exemplary, and many other connection implementations (e.g., one to all, all to all, etc.) are compatible with the disclosure.

The neuromorphic apparatus 1130 is configured to receive input (e.g., visual input) via the interface 1142. In one or more implementations, applicable for example to interfacing with a computerized spiking retina or an image array, the apparatus 1130 may provide feedback information via the interface 1142 to facilitate encoding of the input signal.

The neuromorphic apparatus 1130 is configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place.

Figure 11B:
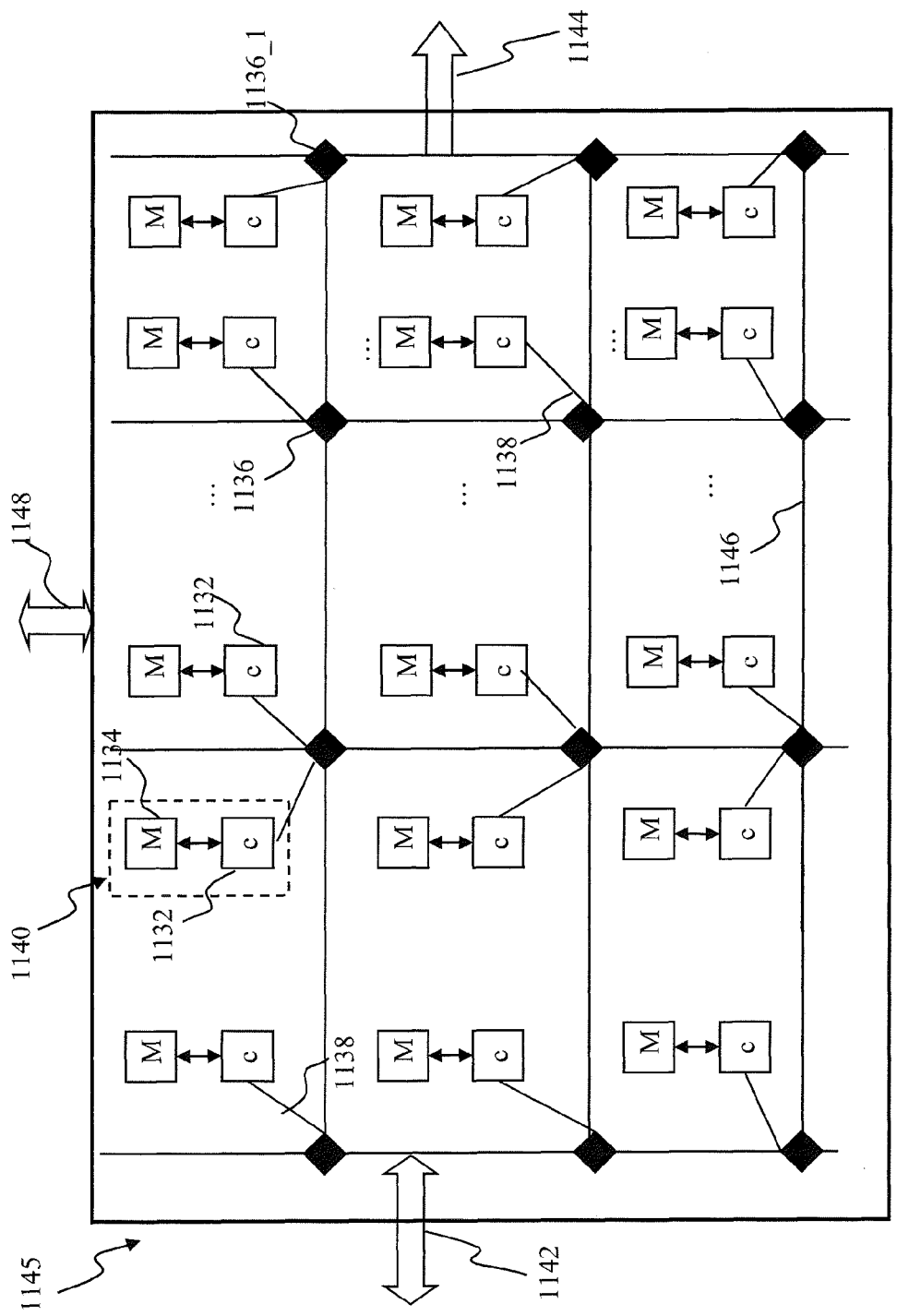
FIG. 11B is a block diagram illustrating a hierarchical neuromorphic computerized system architecture useful with inter alia, a conditional plasticity mechanism in a spiking network, in accordance with one implementation.

FIG. 11B illustrates implementations of a shared bus neuromorphic computerized system comprising micro-blocks 1140, described with respect to FIG. 11A, supra, coupled to a shared interconnect. The apparatus 1145 of FIG. 11B utilizes one (or more) shared bus(es) 1146 in order to interconnect micro-blocks 1140 with one another.

Figure 11C:
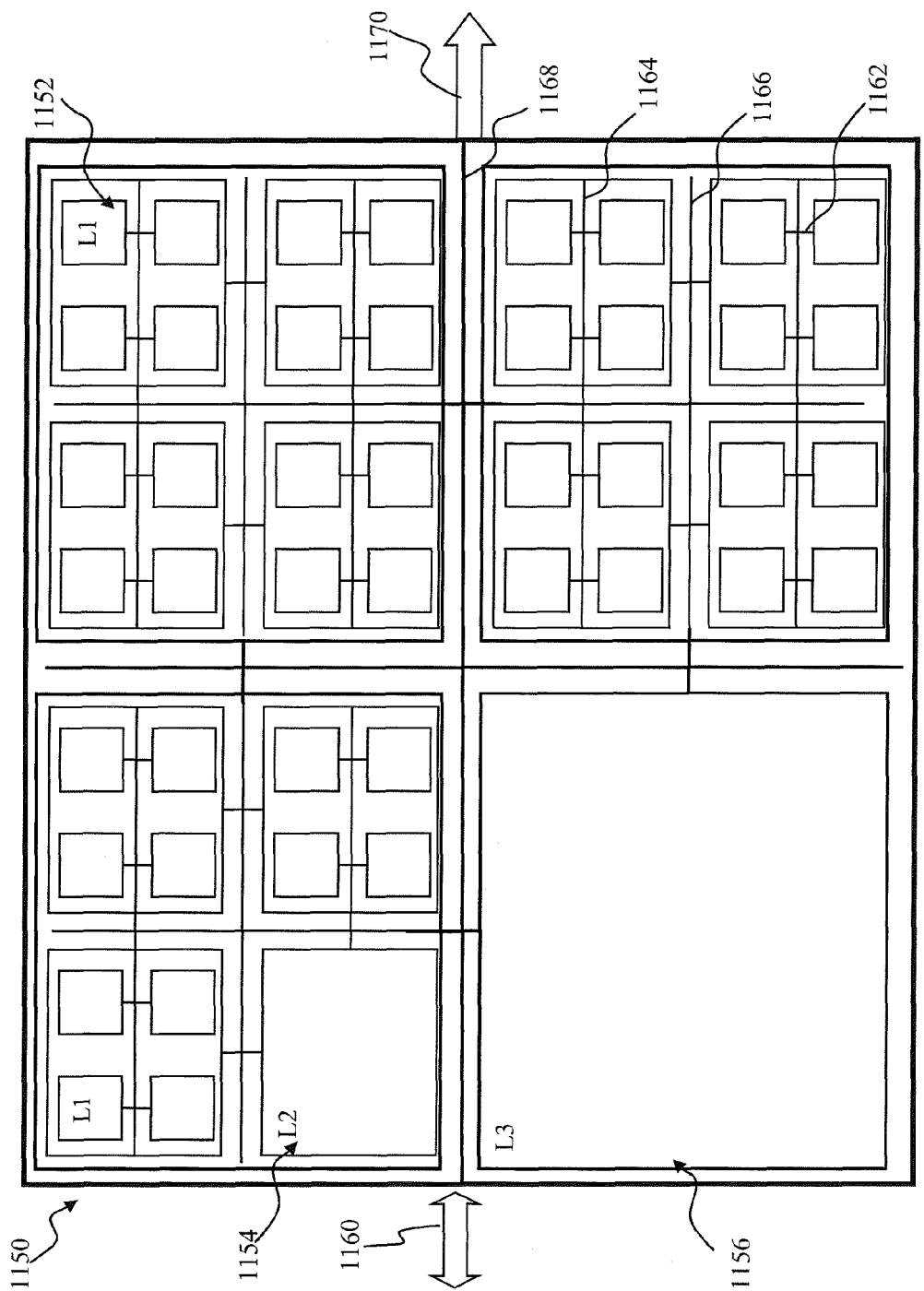
FIG. 11C is a block diagram illustrating a cell-type neuromorphic computerized system architecture useful with, inter alia, a conditional plasticity mechanism in a spiking network, in accordance with one implementation.

FIG. 11C illustrates one implementation of cell-based neuromorphic computerized system architecture configured to implement Conditional plasticity mechanism in a spiking network. The neuromorphic system 1150 of FIG. 11C comprises a hierarchy of processing blocks (cells block). In some implementations, the lowest level L1 cell 1152 of the apparatus 1150 may comprise logic and memory, and may be configured similar to the micro block 1140 of the apparatus shown in FIG. 11A. A number of cell blocks may be arranges in a cluster and communicate with one another a local interconnects 1162, 1164. Each such cluster may form a higher-level cell, e.g., cell L2, denoted as 1154 in FIG. 11C. Similarly, several L2 clusters may communicate with one another via a second-level interconnect 1166 and form a super-cluster L3, denoted as 1156 in FIG. 11C. The super-clusters 1154 may for example communicate via a third level interconnect 1168, and may form a next level cluster, and so on. It will be appreciated by those skilled in the arts that the hierarchical structure of the apparatus 1150, comprising a given number (e.g., four) cells per level, is merely one exemplary implementation, and other implementations may comprise more or fewer cells per level, and/or fewer or more levels, as well as yet other types of architectures.

Different cell levels (e.g., L1, L2, L3) of the exemplary apparatus 1150 of FIG. 11C may be configured to perform functionality with various levels of complexity. In one implementation, different L1 cells may process in parallel different portions of the visual input (e.g., encode different frame macro-blocks), with the L2, L3 cells performing progressively higher-level functionality (e.g., edge detection, object detection). Different L2, L3 cells may also perform different aspects of operating for example a robot, with one or more L2/L3 cells processing visual data from a camera, and other L2/L3 cells operating a motor control block for implementing lens motion when e.g., tracking an object, or performing lens stabilization functions.

The neuromorphic apparatus 1150 may receive input (e.g., visual input) via the interface 1160. In one or more implementations, applicable for example to interfacing with a computerized spiking retina or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may also interface to external fast response memory (e.g., RAM) via high bandwidth memory interface (not shown), thereby enabling storage of intermediate network operational parameters (e.g., spike timing, etc.). The apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task is saved for future use and flushed, and a previously stored network configuration is loaded in its place.

Exemplary Uses and Applications of Certain Aspects of the Disclosure

Various aspects of the disclosure may advantageously be applied to, inter alia, the design and operation of large spiking neural networks configured to process streams of input stimuli, in order to aid in detection and functional binding related aspect of the input.

In some implementations, conditional plasticity mechanisms described herein may be implemented in a spiking neuron of a network, or in a connection of the network. Conditional plasticity adjustment may be able to limit connection potentiation without relying on weight capping Furthermore, the use of efficiency as a control mechanism for modifying plasticity rules may enable achieving (and maintaining) target connection efficiency within the spiking neuron network. The approach of the disclosure can advantageously, among other things, (i) reduce runaway connection potentiation and post-synaptic response generation; (ii) reduce network traffic and/or power consumption; (iii) achieve stable network operation without using pre-defined weight caps; and (iv) enable efficient network operation (e.g., visual input encoding) for a wide variety of input conditions. It will be appreciated that the increased network stability and flexibility may be traded for (a) a less complex, less costly and more robust network capable of processing the same feature set with fewer neurons; and/or (b) a more capable, higher performance network capable of processing larger and more complex feature set with the same number of neurons, when compared to the prior art solutions.

It is appreciated by those skilled in the arts that above implementation are exemplary, and the framework of the disclosure is equally compatible and applicable to processing of other information, such as, for example information classification using a database, where the detection of a particular pattern can be identified as a discrete signal similar to a spike, and where coincident detection of other patterns influences detection of a particular one pattern based on a history of previous detections in a way similar to an operation of exemplary spiking neural network.

Advantageously, exemplary implementations of the present innovation are useful in a variety of devices including without limitation prosthetic devices, autonomous and robotic apparatus, and other electromechanical devices requiring sensory processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence is processed to produce an estimate of the object position (and hence velocity) either at each points in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A method of operating a connection configured to communicate an input to an artificial spiking neuron, said method comprising:
    determining an efficiency associated with operating said connection in accordance with a first plasticity mechanism; and
    based at least in part on an indication, operating said connection in accordance with a second plasticity mechanism;
    wherein:
        said indication is based at least in part on a comparison of said efficiency to a target efficiency;
        said first plasticity mechanism comprises a common portion and a first adjustable portion;
        said second plasticity mechanism comprises said common portion and a second adjustable portion; and
        said second adjustable portion comprises a time-shifted version of said first adjustable portion.

2. The method of claim 1, wherein said second adjustable portion comprises a scaled version of said first adjustable portion.

3. The method of claim 2, wherein
    said input comprises a plurality of events capable of causing generation of one or more responses by said artificial spiking neuron; and
    said determining said efficiency is based at least in part on a number of said plurality of events and a number of said one or more responses.

4. The method of claim 3, wherein said plurality of events comprises a feed-forward stimulus.

5. The method of claim 4, wherein said efficiency is based on a ratio of (i) a portion of said plurality of events delivered to said artificial spiking neuron via said connection that are followed by generation of said one or more responses; to (ii) a total number of said plurality of events.

6. The method of claim 5, wherein:
    said indication is based at least in part on said efficiency being greater than said target efficiency; and
    said second plasticity mechanism is configured to decrease an efficacy of said connection relative said first plasticity mechanism, thereby decreasing a probability of said one or more responses being generated.

7. The method of claim 3, wherein:
    said indication is based at least in part on said efficiency being lower than said target efficiency; and
    said second plasticity mechanism is configured to potentiate said connection.

8. The method of claim 7, wherein said indication is further based at least in part on an event selected from a group consisting of: (i) a timer expiration; (ii) an overflow of a buffer, said buffer capable of storing one or more spike times associated with said input; and (iii) an external trigger, provided to said artificial spiking neuron via a bus, said bus being separate from said connection.

9. A method of operating a connection configured to communicate an input to an artificial spiking neuron, said method comprising:
    determining an efficiency associated with operating said connection in accordance with a first plasticity mechanism; and
    based at least in part on an indication, operating said connection in accordance with a second plasticity mechanism;
    wherein:
        said indication is based at least in part on a comparison of said efficiency to a target efficiency;
        said input comprises a plurality of events capable of causing generation of one or more responses by said artificial spiking neuron; and
        said determining said efficiency is based at least in part on a number of said plurality of events and a number of said one or more responses.

10. The method of claim 9, wherein said efficiency is based on a ratio of (i) a portion of said plurality of events delivered to said artificial spiking neuron via said connection that are followed by generation of said one or more responses; to (ii) a total number of said plurality of events.

11. The method of claim 10, wherein: said plurality of events comprises a feed-forward stimulus.

12. The method of claim 11 wherein: said indication is based at least in part on said efficiency being greater than said target efficiency; and
    said second plasticity mechanism is configured to decrease an efficacy of said connection relative said first plasticity mechanism, thereby decreasing a probability of said one or more responses being generated.

13. The method of claim 12, wherein said indication is further based at least in part on said input being received by said artificial spiking neuron via said connection.

14. The method of claim 12, wherein said indication is further based at least in part on said response being generated by said artificial spiking neuron.

15. The method of claim 10, wherein said indication is further based at least in part on an event selected from a group consisting of: (i) a timer expiration; (ii) an overflow of a buffer, said buffer capable of storing one or more spike times associated with said input; and (iii) an external trigger, provided to said neuron via a bus, said bus being separate from said connection.

16. The method of claim 15, wherein:
    said indication is based at least in part on said efficiency being lower than said target efficiency; and
    said second plasticity mechanism is configured to potentiate said connection.

17. The method of claim 16, wherein:
said potentiation of said connection comprises increasing connection efficacy, thereby increasing a probability of said one or more responses being generated; and
said increased probability is effectuated relative to a probability of said one or more responses being generated associated with said first mechanism.

18. Computerized apparatus comprising a storage medium, said storage medium comprising a plurality of executable instructions being configured to, when executed, adjust an efficiency of a connection associated with at least one spiking neuron, said plurality of executable instructions comprising instructions configured to:
configure an efficacy adjustment of said connection in accordance with a first mechanism when said efficiency is below a target value; and
configure said efficacy adjustment in accordance with a second mechanism at least partly different than said first mechanism when said efficiency is above said target value;
wherein:
said first mechanism comprises a common portion and a first adjustable portion;
said second mechanism comprises said common portion and a second adjustable portion; and
an adjustment of said efficacy that is based on said second adjustable portion is configured to cause a lower value of said efficacy, relative to adjustment of said efficacy that is based on said first adjustable portion.

19. The apparatus of claim 18, wherein:
said second mechanism is configured to potentiate said connection, said potentiation characterized by a time-dependent function that comprises at least a time window associated therewith; and
said potentiation is configured to increase a probability of a response being generated by said at least one spiking neuron.

20. The apparatus of claim 19, wherein said time window is in a range comprising 5 ms and 50 ms inclusive.

21. The apparatus of claim 19, wherein:
said connection is configured to provide an input to said neuron;
said response is characterized by an output time, and said input is characterized by an input time;
said time window is selected based at least in part on said output time and time associated with at least one of a plurality of events associated with said connection;
integration of said time-dependent function over said time window is configured to generate a positive value.

22. The apparatus of claim 21, wherein:
said efficacy is characterized by a connection weight; and
said positive value is configured to increase said connection weight, configured to cause an increase of a probability of generation of said response based at least in part on a stimulus associated with at least one of said plurality of events.

23. The apparatus of claim 22, wherein said event is selected from a group consisting of: (i) a timer expiration; (ii) an overflow of a buffer, said buffer configured to store one or more spike times associated with said input; and (iii) an external trigger, provided to said at least one spiking neuron via a bus, said bus being separate from said connection.

24. The apparatus of claim 21, wherein:
said input comprises a plurality of input spikes configured to cause generation of one or more responses by said at least one spiking neuron;
said determination of said efficiency is based at least in part on a ratio of: (i) a portion of said plurality of said input spikes delivered to said at least one spiking neuron via said connection that are followed by generation of said one or more responses within a time interval; and (ii) a total number of said input spikes within said interval; and
said interval is configured to exceed said time window.

25. Computerized apparatus comprising a storage medium, said storage medium comprising a plurality of executable instructions being configured to, when executed, adjust an efficiency of a connection associated with at least one spiking neuron, said plurality of executable instructions comprising instructions configured to:
configure an efficacy adjustment of said connection in accordance with a first mechanism when said efficiency is below a target value; and
configure said efficacy adjustment in accordance with a second mechanism at least partly different than said first mechanism when said efficiency is above said target value;
wherein:
said connection is configured to provide feed-forward input to said at least one spiking neuron, said input configured to cause generation of a response by said at least one spiking neuron; and
said efficiency is based at least in part on a ratio of: (i) a portion of said input delivered to said at least one spiking neuron via said connection that is followed by generation of said response; and (ii) total amount of input delivered to said neuron via said connection.

26. The apparatus of claim 25, wherein said efficacy adjustment in accordance with said second mechanism is configured to decrease a probability of said response being generated.

27. A computerized spiking neural network apparatus comprising a storage medium, said storage medium comprising a plurality of instructions configured to, when executed, implement dynamic control of responses of a neuron of said neural network to feed-forward stimulus received by said neuron via a plurality of connections, said plurality of executable instructions comprising instructions configured to:
for at least one of said plurality of connections that provides at least a portion of said stimulus, apply a first plasticity mechanism; and
based at least in part on an indication, apply a second plasticity mechanism different than said first plasticity mechanism;
wherein:
said first and second plasticity mechanisms cooperate to effectuate said dynamic control; and
said first and said second mechanisms further cooperate to eliminate positive feedback within a loop, said loop comprising said neuron, said at least one of said plurality of connections; and another neuron configured to provide said at least a portion of said stimulus to said neuron via said at least one of said plurality of connections.

28. A computerized spiking neural network apparatus comprising a storage medium, said storage medium comprising a plurality of instructions configured to, when executed, implement dynamic control of responses of a neuron of said neural network to feed-forward stimulus received by said neuron via a plurality of connections by at least:
for at least one of said plurality of connections that provides at least a portion of said stimulus, apply a first plasticity mechanism; and based at least in part on an indication, apply a second plasticity mechanism different than said first plasticity mechanism;

wherein:

said first and second mechanisms cooperate to effectuate said dynamic control;

said elimination of positive feedback comprises a determination of connection efficiency associated with operation of said connection in accordance with said first plasticity mechanism; and said efficiency is based on a ratio of: (i) a portion of inputs delivered to said neuron via said connection that are followed by generation of said response; and (ii) a total number of inputs delivered to said neuron via said connection.

29. The apparatus of claim 28, wherein:

said indication is based at least in part on said connection efficiency being lower than said target connection efficiency; and said second plasticity mechanism is configured to potentiate said connection.

30. Computerized apparatus comprising:

means for configuring an efficacy adjustment of said connection in accordance with a first mechanism when said efficiency is below a target value;

means for configuring said efficacy adjustment in accordance with a second mechanism at least partly different than said first mechanism when said efficiency is above said target value; and wherein:

said first mechanism comprises a common portion and a first adjustable portion;

said second mechanism comprises said common portion and a second adjustable portion; and an adjustment of said efficacy that is based on said second adjustable portion is configured to cause a lower value of said efficacy, relative adjustment of said efficacy that based on said first portion.

* * * * *